United States Patent
Peng et al.

(10) Patent No.: US 8,249,395 B2
(45) Date of Patent: Aug. 21, 2012

(54) SYSTEM, METHOD, AND COMPUTER PROGRAM PRODUCT FOR PICTURE RESIZING

(75) Inventors: Ya-Ti Peng, Sunnyvale, CA (US); Yi-Jen Chiu, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 358 days.

(21) Appl. No.: 12/718,033

(22) Filed: Mar. 5, 2010

(65) Prior Publication Data

US 2011/0216985 A1    Sep. 8, 2011

(51) Int. Cl.
*G06K 9/32* (2006.01)
(52) U.S. Cl. ........ 382/300; 382/260; 382/261; 382/262; 382/263; 382/264; 382/265; 382/266; 382/294; 348/538
(58) Field of Classification Search .......... 382/260–266, 382/294, 300; 348/538
See application file for complete search history.

(56) References Cited

U.S. PATENT DOCUMENTS

| | | | |
|---|---|---|---|
| 6,456,339 B1* | 9/2002 | Surati et al. | 348/745 |
| 6,593,925 B1* | 7/2003 | Hakura et al. | 345/426 |
| 7,187,811 B2* | 3/2007 | Lin et al. | 382/299 |
| 7,502,505 B2* | 3/2009 | Malvar et al. | 382/162 |
| 7,519,235 B1* | 4/2009 | Georgiev | 382/298 |
| 7,545,957 B2* | 6/2009 | Cornog et al. | 382/107 |
| 7,693,350 B2* | 4/2010 | Shimizu | 382/300 |
| 7,876,979 B2* | 1/2011 | Lee et al. | 382/300 |
| 2005/0078883 A1* | 4/2005 | Yi | 382/300 |
| 2009/0123089 A1* | 5/2009 | Karlov et al. | 382/300 |
| 2010/0254630 A1* | 10/2010 | Ali et al. | 382/300 |
| 2011/0150354 A1* | 6/2011 | Huang | 382/260 |
| 2012/0082396 A1* | 4/2012 | Crandall et al. | 382/266 |

FOREIGN PATENT DOCUMENTS

EP    1041511 A3    9/2001
EP    1041511 A3 *  9/2001

OTHER PUBLICATIONS

Application—upscaler, Speigle et al., SPIE, vol. 7240, 2009, pp. 72401S-1 to 72401 S-14.*
Search and Examination Report Received for GB Application No. 1102996.4, mailed on Jun. 14, 2011, 12 Pages.

* cited by examiner

*Primary Examiner* — Jayesh A Patel
(74) *Attorney, Agent, or Firm* — Garrett IP, LLC

(57) ABSTRACT

System, method, and computer program product to adaptively blend the interpolation results from an 8-tap Lanczos filter and the interpolation results from a bilinear filter, according to the local transitions of the input content. Artifacts may occur, which may be identified as such and corrected. Pixels that represent artifacts in the blended image may be replaced with the pixel for that location taken from the bilinear interpolation.

18 Claims, 5 Drawing Sheets

SYSTEM, METHOD, AND COMPUTER PROGRAM PRODUCT FOR PICTURE RESIZING

BACKGROUND

Image resizing is a common operation in digital image/video processing. An interpolation process is often involved in resizing. Filters such as box (e.g., nearest-neighbor interpolation), tent (e.g., bilinear interpolation), cubic spline (e.g., bicubic interpolation) and a variety of kernels approximating the sinc function have been popular solutions for image interpolation. Among these approaches, the Lanczos filter, a windowed form of the sinc filter, may provide a sharper output than common bilinear or bicubic interpolation. Moreover, the Lanczos filter may be considered to be an effective compromise in terms of aliasing, ringing, and sharpness compared to other approaches.

For an N-lobed Lanczos-windowed sinc function, its oscillation nature can induce a ringing effect and the negative values in the resulting kernel can produce undershoot (i.e., the output is lower than the input). The ringing effect often appears as artificial rings near edges.

BRIEF DESCRIPTION OF THE DRAWINGS/FIGURES

DETAILED DESCRIPTION

A preferred embodiment is now described with reference to the figures, where like reference numbers indicate identical or functionally similar elements. Also in the figures, the leftmost digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

Disclosed herein are methods and systems to blend the interpolation results from a Lanczos filter and the interpolation results from a bilinear filter. The blending may be done adaptively, according to the local transitions of the input content. Undershoot may occur, which accentuates transitions in images and can be beneficial for generating sharper scaled images. However, it may produce artifacts in certain patterns as well. Detection and correction of this kind of artifact may be performed.

Figure 1:
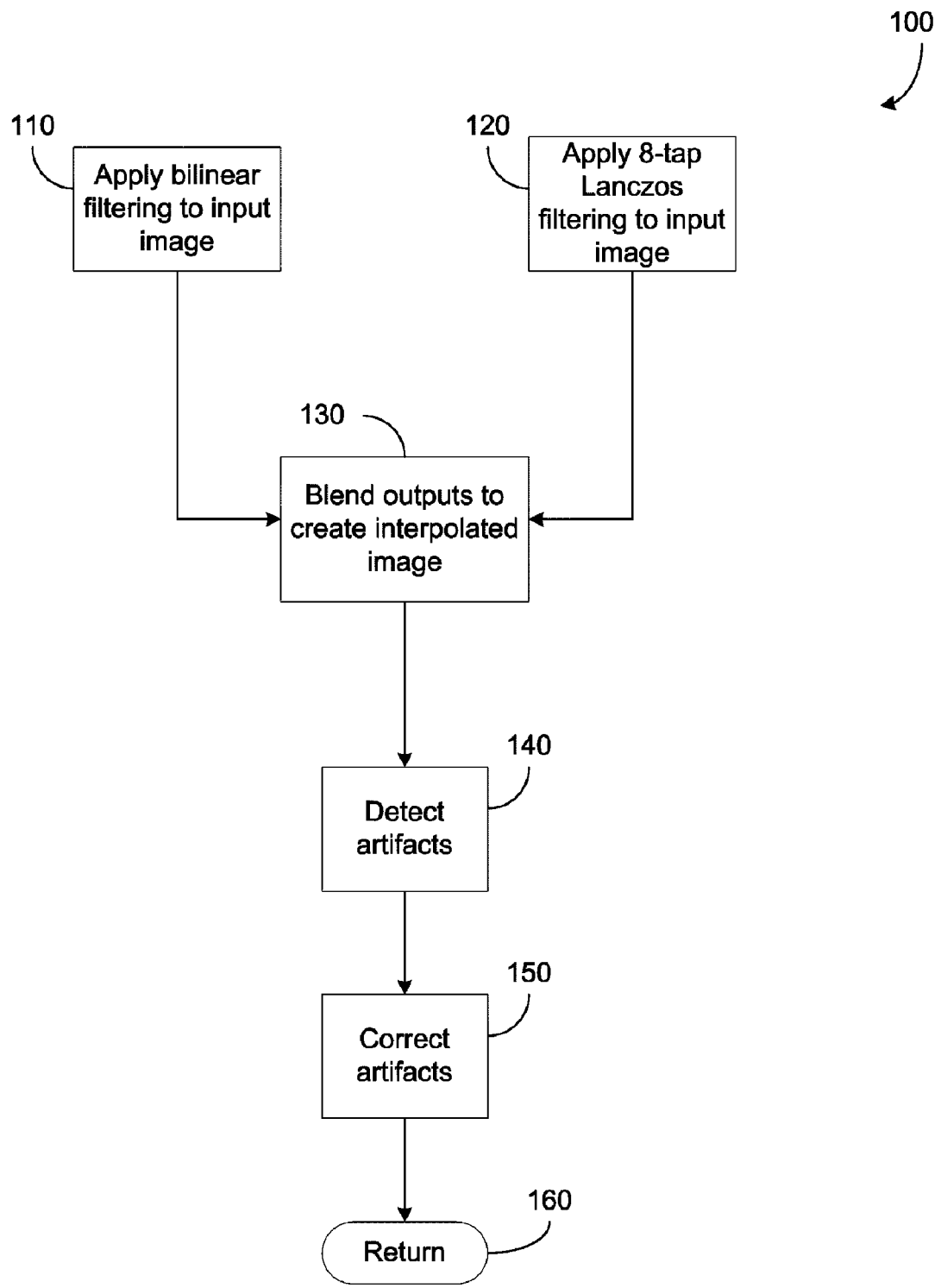
FIG. 1 is a block diagram illustrating processing of the system described herein, according to an embodiment.

FIG. 1 illustrates the overall processing of the system described herein, according to an embodiment. At 110, an input image may be resized, using bilinear filtering. At 120, the input image may be resized using 8-tap Lanczos filtering. The outputs, i.e., resized images, produced by 110 and 120 may be blended at 130. This may create a single blended image. At 140, artifacts may be detected in the blended image. At 150, any detected artifacts may be corrected. The process may conclude at 160.

Figure 2:
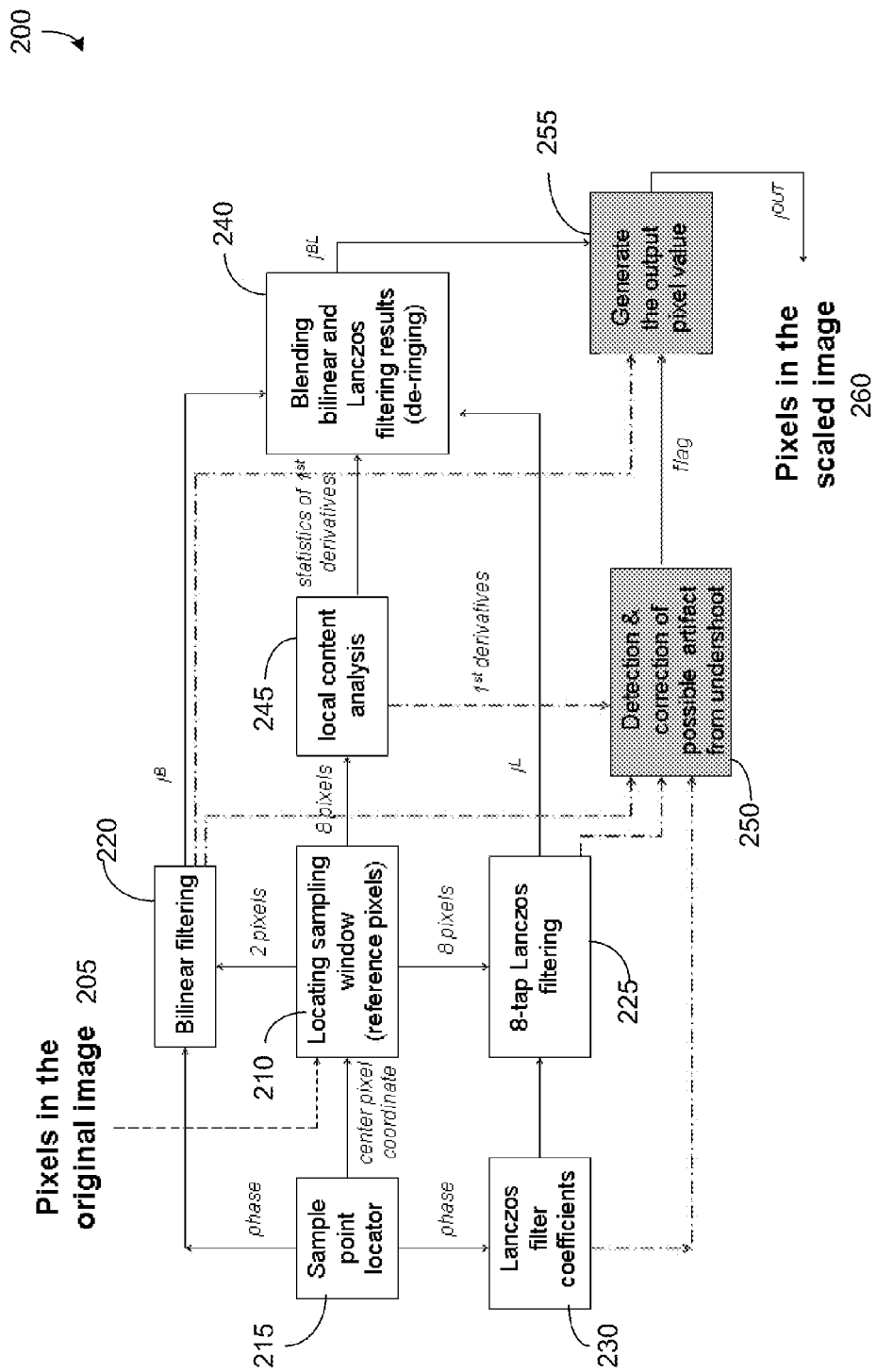
FIG. 2 is a block diagram illustrating the system described herein, according to an embodiment.

A system that may perform this process is shown in FIG. 2, according to an embodiment. The pixels of an original input image are shown as pixels 205. These pixels may be provided to a sampling window module 210 that locates a sampling window in the input image. A sampling window may be based on a specific point or location in the input image. Such a location may be represented by a center pixel coordinate that may be provided to sampling window module 210 by a sample point locator module 215. The sampling window module 210 may then provide two pixels to bilinear filtering module 220. The sampling window module 210 may also provide eight pixels to an 8-tap Lanczos filtering module 220. In order for the Lanczos filtering module 225 to operate, this module may require filter coefficients. Such coefficients may be provided by coefficients module 230. In the illustrated embodiment, the generation of coefficients by module 230 may use phase information that is provided by sample point locator module 215. Sample point locator module 215 may also provide phase information to bilinear filtering module 220.

Bilinear filtering module 220 and Lanczos filtering module 225 may each provide respective resized images to blending module 240. In order to perform blending of these inputs, blending module 240 may also require local content information provided by local content analysis module 245. Local content analysis module 245 may generate the local content information on the basis of pixels identified by a sampling window module 210. These pixels may be viewed as the window of pixels surrounding the pixel coordinate identified by sample point locator module 215.

The blending module 240 may provide filtering results to output module 255. The output module 255 may generate a scaled image composed of pixels 260. In order to generate this scaled image, output module 255 may rely on information provided by detection and correction module 250. This latter module may identify and correct artifacts that are found in the blended output of module 240. In the illustrated embodiment, detection and correction module 250 may also take advantage of local content information produced by local content analysis module 245. The scaled image composed of pixels 260 may then be sent to a display device for viewing, or may be sent to a memory device for storage and/or additional subsequent processing.

Figure 3:
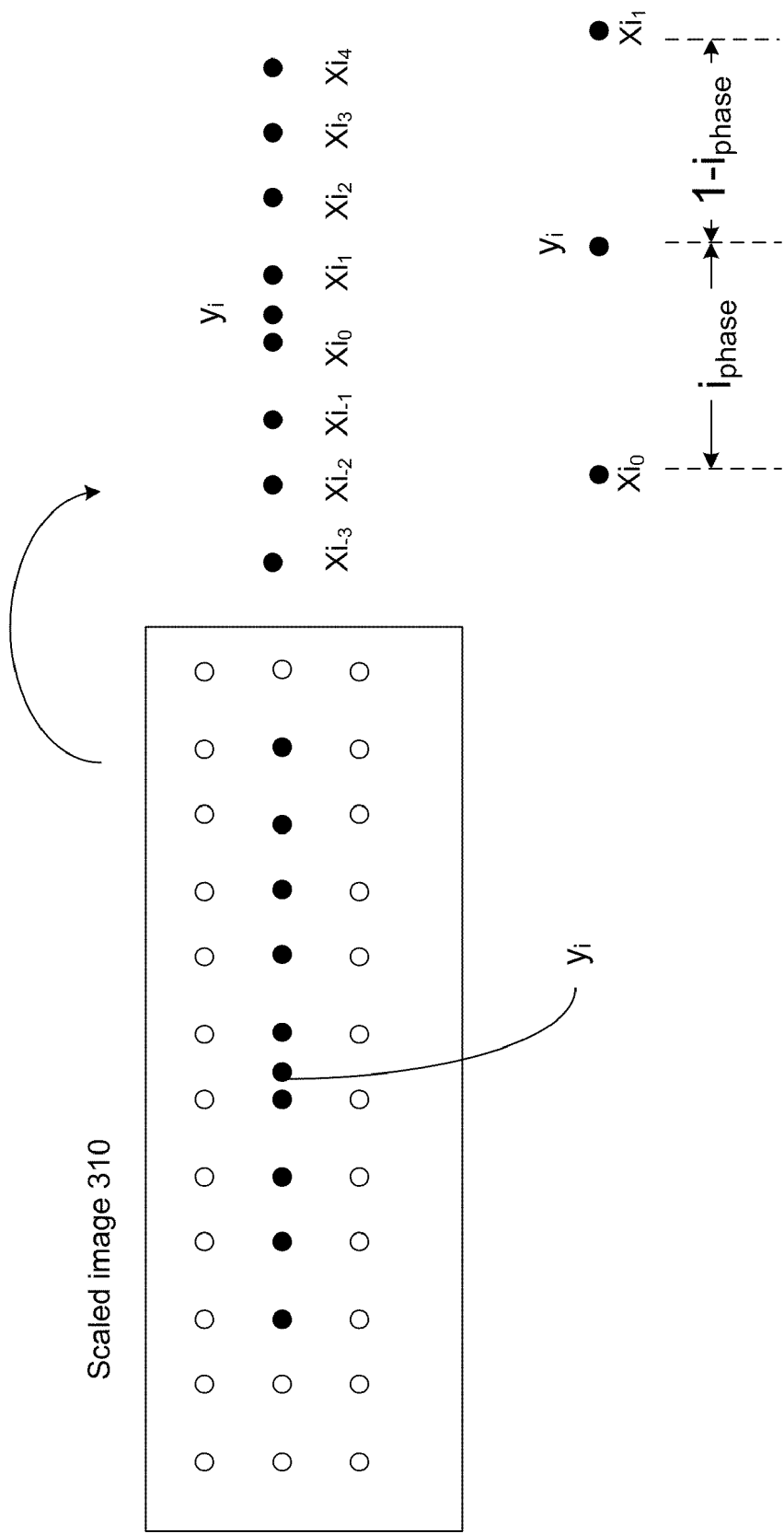
FIG. 3 illustrates the resizing process and the use of a sampling window, according to an embodiment.

FIG. 3 illustrates a scaling process, according to an embodiment. This figure shows a set of pixels in a scaled image 310. The darkened pixels may collectively represent a sampling window. The indicated pixel $y_i$ may represent a center pixel for the window. The other pixels in the window are labeled as $xi_{-3}$, $xi_{-2}$, $xi_{-1}$, $xi_0$, $xi_1$, $xi_2$, $xi_3$, and $xi_o$, where $y_i$ may fall between $xi_0$ and $xi_1$.

Note that, in general, an interpolator includes two components, a horizontal interpolator and a vertical interpolator. In FIG. 3, and in the remainder of this description, processing is described in terms of horizontal interpolation. It should be understood that processing with respect to vertical interpolation may be analogous. The concepts, processes, and systems described herein with respect to horizontal interpolation may be directly applicable to vertical interpolation.

In the case of horizontal interpolation, as in the case of vertical interpolation, the sample point locator module first determines the two pixels between which the center pixel is located. In the example of FIG. 3, those two pixels are shown as $xi_0$ and $xi_1$. The phase differences between $xi_0$ and $y_i$, and between $y_i$ and $xi_1$ are shown as $i_{phase}$ and $1-i_{phase}$ respectively. Assuming that $i_0 \in$ int and $i_{phase} \in [0,1)$, then the bilinear interpolated pixel $y_i^B$ may be calculated as $$y_i^B = xi_0 * (1-i_{phase}) + xi_1 * i_{phase}.$$

Here, both $i_{phase}$ and $1-i_{phase}$ are between 0 and 1. $y_i^B$ may therefore be viewed as a weighted sum of $xi_0$ and $xi_1$.

The realization of $y_i$ using an 8-tap Lanczos filter may be calculated as $$y_i^L = \Sigma xi_k h_k^{iphase} \text{ where } k=-3,-2,\ldots,4.$$

Here, $h_k^{iphase}$ is the sample from the 4-lobed Lanczos-windowed function $$h_k^{iphase} = (\sin \pi[(k-i_{phase})*sf]/\pi[(k-i_{phase})*sf])(\sin \pi[((k-i_{phase})/4)*sf]/\pi[((k-i_{phase})/4)*sf]) \text{ when } |k-i_{phase})*sf|<4, \text{ and}$$

$$h_k^{iphase} = 0 \text{ when } |(k-i_{phase})*sf| \geq 4.$$

In the above expressions, sf represents the scaling factor.

Blending $y_i^B$ and $y_i^L$ may maintain the sharpness that comes from Lanczos filtering while reducing the ringing effect. Such blending may result in the realization of $y_i$ as $$y_i^{BL} = \alpha_i * y_i^L + (1-\alpha_i) * y_i^B,$$

where $\alpha_i = f(xi_{-3}, xi_{-2}, xi_{-1}, xi_0, xi_1, xi_2, xi_3, xi_4)$ and $\alpha$ may be a function of local content. In an embodiment, $\alpha_i$ may be defined as follows:

$$\alpha_i = \max(D', D''),$$

where $D'' = \max(|i_k - i_{k+1}|)$, where $k \in -2, -1, 0, \ldots 4$,
$D' = \min(D_1, D_2)$,
$D_1 = \min[\max(|Xi_1-Xi_2|,|Xi_0-Xi_1|), \max(|Xi_1-Xi_2|,|Xi_2-Xi_3|)]$, and
$D_2 = [Xi_1 + Xi_1 - 2Xi_0] + [2Xi_2 - Xi_1 - Xi_3]$.

Once blending is complete, the determination may be made as to whether a pixel $y_i^{BL}$ represents an artifact. If the pixel is determined to be an artifact, then the pixel may be replaced by the pixel, for the same location, that had resulted from application of the bilinear filtering, $y_i^B$. In an implementation, detection of an artifact at $y_i^{BL}$ may result in the setting of a flag. For any pixel where such a flag is set, the pixel may be replaced by the pixel $y_i^B$ that resulted from application of the bilinear filtering. Stated more formally, for the output pixel $y_i^{out}$, $$y_i^{out} = y_i^B \text{ if flag}(y_i) = 1, \text{ and}$$

$$y_i^{out} = y_i^{BL} \text{ if flag}(y_i) = 0$$

Figure 4:
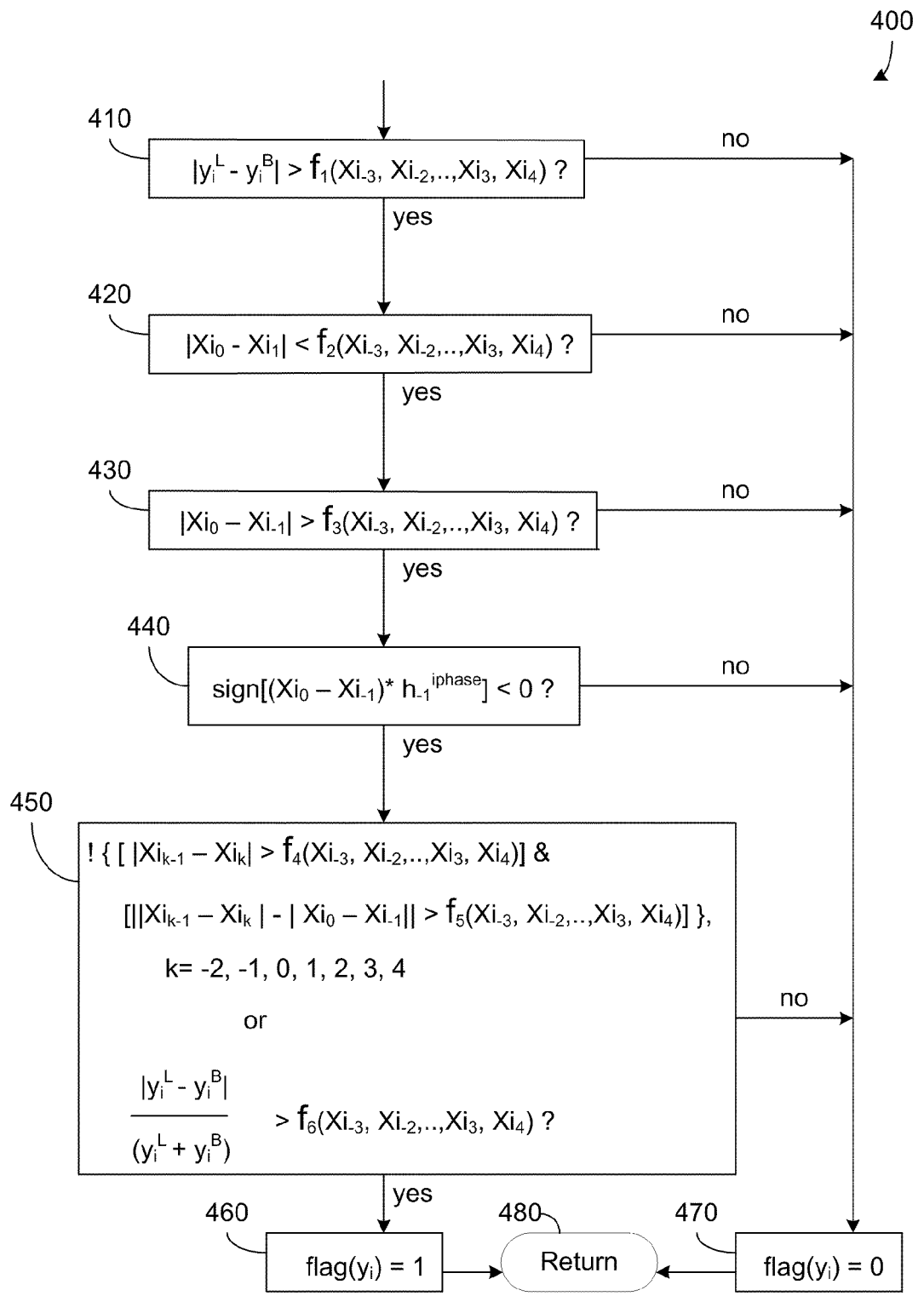
FIG. 4 is a flowchart illustrating a process for determination of an artifact, according to an embodiment.

In an embodiment, a pixel may be determined to be an artifact by applying the test illustrated in FIG. 4. This figure shows a set of logical expressions 410-450, where if any of these are false, then the pixel $y_i$ is not an artifact, and the final output pixel $y_i^{out}$ may keep the value $y_i^{BL}$. If all the conditions 410-450 are true, then the pixel $y_i$ may be considered to be an artifact, and $y_i^{out}$ may be assigned the value $y_i^B$.

At 410, a determination may be made as to whether the following is true:

$$|y_i^L - y_i^B| > f_1(Xi_{-3}, Xi_{-2}, \ldots, Xi_3, Xi_4).$$

If not, then flag($y_i$) may be given a value 0 at 470, and the process concludes at 480. If this expression is true, the process may continue at 420.

At 420, a determination may be made as to whether the following is true:

$$|Xi_0 - Xi_1| < f_2(Xi_{-3}, Xi_{-2}, \ldots, Xi_3, Xi_4).$$

If not, then flag($y_i$) may be given a value 0 at 470, and the process may conclude at 480. If this expression is true, the process may continues at 430.

At 430, a determination may be made as to whether the following is true:

$$|Xi_0 - Xi_{-1}| > f_3(Xi_{-3}, Xi_{-2}, \ldots, Xi_3, Xi_4).$$

If not, then flag($y_i$) may be given a value 0 at 470, and the process may conclude at 480. If this expression is true, the process may continue at 440.

At 440, a determination may be made as to whether the following is true:

$$\text{sign}[(Xi_0 - Xi_{-1}) * h_{-1}^{iphase}] < 0.$$

If not, then flag($y_i$) may be given a value 0 at 470, and the process may conclude at 480. If this expression is true, the process may continue at 450.

At 450, a determination may be made as to whether the following expression is true:

$$!\{[|Xi_{k-1} - X_k| > f_4(Xi_{-3}, Xi_{-2}, \ldots, Xi_3, Xi_4)] \& [||Xi_{k-1} - Xi_k| - |Xi_0 - Xi_{-1}|| > f_5(Xi_{-3}, Xi_{-2}, \ldots, Xi_3, Xi_4)]\}$$

for all $k = -2, -1, 0, 1, 2, 3, 4$ or $$|y_i^L - y_i^B|/(y_i^L + y_i^B) > f_6(Xi_{-3}, Xi_{-2}, \ldots, Xi_3, Xi_4)$$

If not, then flag($y_i$) may be given a value 0 at 470, and the process may conclude at 480. If this expression is true, the process may continue at 460. At 460, flag($y_i$) may be given a value of 1.

The functions $f_1$ through $f_6$ may be defined as functions of $(Xi_{-3}, Xi_{-2}, \ldots, Xi_3, Xi_4)$ as indicated above. Alternatively, $f_1$ through $f_6$ may be given predefined constant values. In an embodiment, $f_1 = 64$,
$f_2 = 16$,
$f_3 = 20$,
$f_4 = 20$,
$f_5 = 10$, and
$f_6 = 1$.

Note that the application of 410-440 may capture interpolated pixels with large undershoot values in certain image patterns, such as smooth regions with some regular thin strips. The application of 450 may, for other image patterns, perform protection of undershoot values to maintain sharpness.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 5:
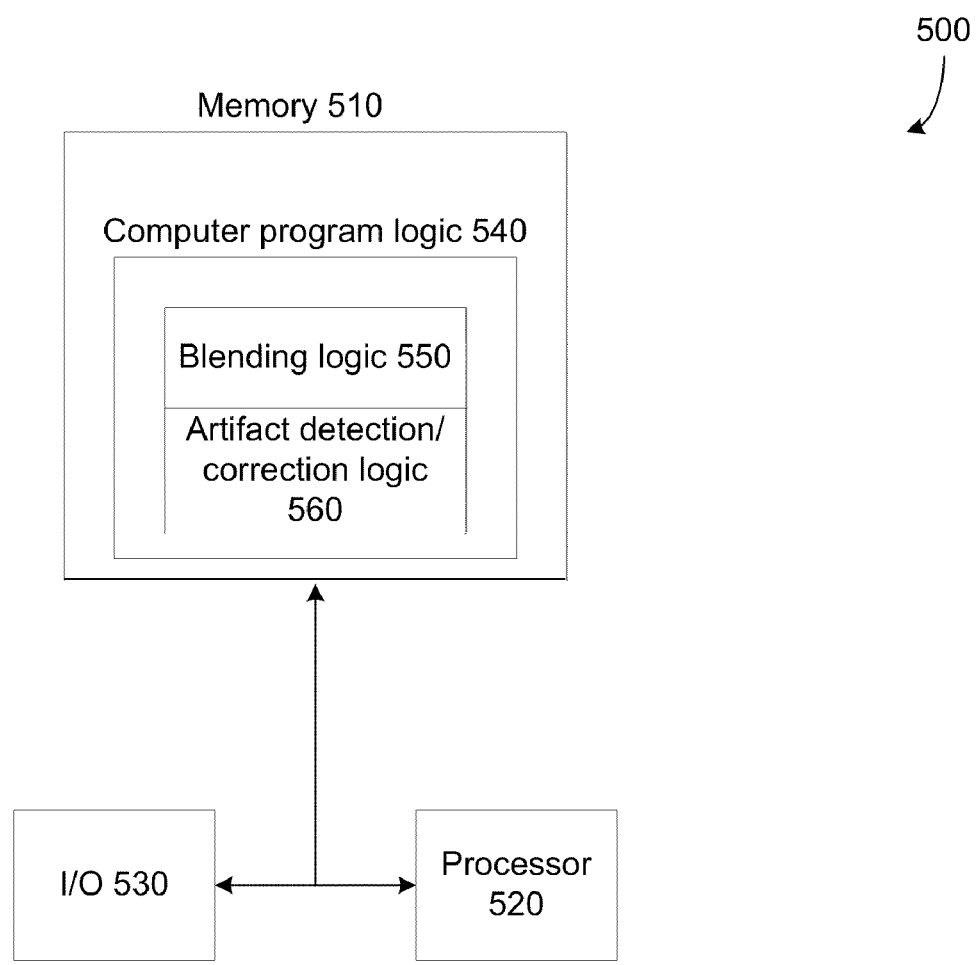
FIG. 5 is a block diagram illustrating a software or firmware embodiment of the system described herein.

A software embodiment is illustrated in the context of a computing system 500 in FIG. 5. System 500 may include a processor 520 and a body of memory 510 that may include one or more computer readable media that may store computer program logic 540. Memory 510 may be implemented as a hard disk and drive, a removable media such as a compact disk and drive, or a read-only memory (ROM) device, for example. Processor 520 and memory 510 may be in communication using any of several technologies known to one of ordinary skill in the art, such as a bus. Computer program logic contained in memory 510 may be read and executed by processor 520. One or more I/O ports and/or I/O devices, shown collectively as I/O 530, may also be connected to processor 520 and memory 510.

Computer program logic may include modules 550 and 560, according to an embodiment. Blending logic 550 may be responsible for blending the outputs of an interpolation process that uses bilinear filtering, and an interpolation process that uses 8-tap Lanczos filtering. The blending process is described above, according to an embodiment. Artifact detection and correction logic 560 may be responsible for evaluating pixels that are output from blending logic 550. In this evaluation, a determination may be made for each pixel as to whether the pixel represents an artifact. Details of this determination are described above with respect to FIG. 4. Logic 560 may then correct any such artifacts.

In an embodiment, the resulting image, with artifacts corrected, may be sent to I/O 530, which may include a display on which the image may be displayed. Alternatively, the image may be sent to a memory device for storage.

Methods and systems are disclosed herein with the aid of functional building blocks that illustrate the functions, features, and relationships thereof. At least some of the boundaries of these functional building blocks have been arbitrarily defined herein for the convenience of the description. Alternate boundaries may be defined so long as the specified functions and relationships thereof are appropriately performed.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the exemplary embodiments disclosed herein.

What is claimed is:

1. A method, comprising:
    scaling an input image using bilinear filtering, generating a first output;
    scaling the input image using 8-tap Lanczos filtering, generating a second output;
    blending the first and second outputs to create a blended image;
    detecting artifacts in the blended image;
    correcting the detected artifacts; and
    displaying, on a display device, an output image that results from said detection and correction of the artifacts,
    wherein said method is performed using a programmable processor.

2. The method of claim 1, wherein said the scaling of the input image using bilinear filtering comprises:
    calculating a pixel of the first output as
    $$y_i^B = xi_0 * (1 - i_{phase}) + xi_1 * i_{phase},$$
    where
    $i_0$ and $i_1$ are x-coordinates of respective pixels on either side of the pixel $y_i$ of the input image,
    $xi_0$ and $xi_1$ are pixels at respective locations $i_0$ and $i_1$,
    $i_0 \in$ int, and
    $i_{phase} \in [0,1)$.

3. The method of claim 2, wherein said scaling of the input image using 8-tap Lanczos filtering comprises:
    calculating a pixel of the second output as
    $$y_i^L = \Sigma xi_k h_k^{iphase}$$
    where $k = -3, -2, \ldots, 4$,
    $h_k^{iphase}$ is a sample from a 4-lobed Lanczos-windowed function $$h_k^{iphase} = (\sin \pi[(k-i_{phase})*sf]/\pi[(k-i_{phase})*sf])(\sin \pi[((k-i_{phase})/4)*sf]/\pi[((k-i_{phase})/4)*sf]) \text{ when } |k-i_{phase})*sf| < 4, \text{ and}$$

$$h_k^{iphase} = 0 \text{ when } |k-i_{phase})*sf| >= 4.$$

4. The method of claim 3, wherein a pixel $y_i^{BL}$ of the blended image is calculated as $y_i^{BL} = \alpha_i * y_i^L + (1-\alpha_i) * y_i^B$, where $\alpha_i = f(xi_{-3}, xi_{-2}, xi_{-1}, xi_0, xi_1, xi_2, xi_3, xi_4)$ and $\alpha$ is a function of local content.

5. The method of claim 3, wherein detecting artifacts comprises determining whether the following conditions are met, $$|y_i^L - y_i^B| > f_1(Xi_{-3}, Xi_{-2}, \ldots, Xi_3, Xi_4);$$

$$|Xi_0 - Xi_1| < f_2(Xi_{-3}, Xi_{-2}, \ldots, Xi_3, Xi_4);$$

$$|Xi_0 - Xi_{-1}| > f_3(Xi_{-3}, Xi_{-2}, \ldots, Xi_3, Xi_4);$$

$$\text{sign}[(Xi_0 - Xi_{-1}) * h_{-1}^{iphase}] < 0;$$

$$!\{[|Xi_{k-1} - Xi_k| > f_4(Xi_{-3}, Xi_{-2}, \ldots, Xi_3, Xi_4)] \& [||Xi_{k-1} - Xi_k| - |Xi_0 - Xi_{-1}|| > f_5(Xi_{-3}, Xi_{-2}, \ldots, Xi_3, Xi_4)]\}$$

for all $k = -2, -1, 0, 1, 2, 3, 4$
or $$|y_i^L - y_i^B| / (y_i^L + y_i^B) > f_6(Xi_{-3}, Xi_{-2}, \ldots, Xi_3, Xi_4),$$

where, when the conditions are met, then pixel $y_i^{BL}$ is determined to be an artifact.

6. The method of claim 5, wherein when pixel $y_i^{BL}$ is determined to be an artifact, then correction of the artifact comprises replacing $y_i^{BL}$ with $y_i^B$.

7. A system, comprising:
    a processor; and
    a memory in communication with said processor, wherein said memory stores
        a plurality of processing instructions configured to direct said processor to scale an input image using bilinear filtering, generating a first output,
        a plurality of processing instructions configured to direct said processor to scale the input image using 8-tap Lanczos filtering, generating a second output,
        a plurality of processing instructions configured to direct said processor to blend the first and second outputs to create a blended image,
        a plurality of processing instructions configured to direct said processor to detect artifacts in the blended image,
        a plurality of processing instructions configured to direct said processor to correct the detected artifacts, and
        a plurality of processing instructions configured to direct said processor to display, on a display device, an output image that results from the detection and correction of the artifacts.

8. The system of claim 7, wherein said plurality of processing instructions configured to direct said processor to scale the input image using bilinear filtering comprises:
    processing instructions configured to direct said processor to calculate a pixel of the first output as $$y_i^B = xi_0 * (1 - i_{phase}) + xi_1 * i_{phase},$$

where
    $i_0$ and $i_1$ are x-coordinates of respective pixels on either side of the pixel $y_i$ of the input image,
    $xi_0$ and $xi_1$ are pixels at respective locations $i_0$ and $i_1$,
    $i_0 \in$ int, and
    $i_{phase} \in [0,1)$.

9. The system of claim 8, wherein said plurality of processing instructions configured to direct said processor to scale the input image using 8-tap Lanczos filtering comprises:

processing instructions configured to direct said processor to calculate a pixel of the second output as $$y_i^L = \Sigma x i_k h_k^{iphase} \text{ where } k=-3,-2,\ldots,4,$$

where $h_k^{iphase}$ is a sample from a 4-lobed Lanczos-windowed function $$h_k^{iphase} = (\sin \pi[(k-i_{phase})*sf]/\pi[(k-i_{phase})*sf])(\sin \pi[((k-i_{phase})/4)*sf]/\pi[((k-i_{phase})/4)*sf]) \text{ when } |k-i_{phase}|*sf| < 4, \text{ and}$$

$$h_k^{iphase} = 0 \text{ when } |k-i_{phase}|*sf| >= 4.$$

10. The system of claim 9, wherein said plurality of processing instructions configured to direct said processor to blend said first and second outputs comprises:
processing instructions configured to direct said processor to calculate a pixel $y_i^{BL}$ of the blended image as $$y_i^{BL} = \alpha_i * y_i^L + (1-\alpha_i) * y_i^B,$$

where $\alpha_i = f(xi_{-3}, xi_{-2}, xi_{-1}, xi_0, xi_1, xi_2, xi_3, xi_4)$ and $\alpha$ is a function of local content.

11. The system of claim 9, wherein said plurality of processing instructions configured to direct said processor to detect artifacts comprises:
processing instructions configured to direct said processor to determine whether the following conditions are met, $$|y_i^L - y_i^B| > f_1(Xi_{-3}, Xi_{-2}, \ldots, Xi_3, Xi_4);$$

$$|Xi_0 - Xi_1| < f_2(Xi_{-3}, Xi_{-2}, \ldots, Xi_3, Xi_4);$$

$$|Xi_0 - Xi_{-1}| > f_3(Xi_{-3}, Xi_{-2}, \ldots, Xi_3, Xi_4);$$

$$\text{sign}[(Xi_0 - Xi_{-1}) * h_{-1}^{iphase}] < 0;$$

$$!\{[|Xi_{k-1} - Xi_k| > f_4(Xi_{-3}, Xi_{-2}, \ldots, Xi_3, Xi_4)] \& [||Xi_{k-1} - Xi_k| - |Xi_0 - Xi_{-1}|| > f_5(Xi_{-3}, Xi_{-2}, \ldots, Xi_3, Xi_4)]\}$$

for all k=−2, −1, 0, 1, 2, 3, 4
or $$|y_i^L - y_i^B|/(y_i^L + y_i^B) > f_6(Xi_{-3}, Xi_{-2}, \ldots, Xi_3, Xi_4),$$

where, when the conditions are met, then pixel $y_i^{BL}$ is determined to be an artifact.

12. The system of claim 11, wherein said processing instructions configured to direct said processor to correct the detected artifacts comprises:
processing instructions configured to direct said processor to replace $y_i^{BL}$ with $y_i^B$ when $y_i^{BL}$ has been determined to be an artifact.

13. A computer program product including a non-transitory computer readable medium having computer program logic stored therein, the computer program logic including:
logic to cause a processor to scale an input image using bilinear filtering, generating a first output;
logic to cause the processor to scale the input image using 8-tap Lanczos filtering, generating a second output;
logic to cause the processor to blend the first and second outputs to create a blended image;
logic to cause the processor to detect artifacts in the blended image;
logic to cause the processor to correct the detected artifacts; and
logic to cause the processor to display, on a display device, an output image that results from the detection and correction of the artifacts.

14. The computer program product of claim 13, wherein the logic to cause the processor to scale the input image using bilinear filtering comprises:
logic to cause the processor to calculate a pixel of the first output as $$y_i^B = xi_0*(1-i_{phase}) + xi_1*i_{phase},$$

where $i_0$ and $i_1$ are x-coordinates of respective pixels on either side of the pixel $y_i$ of the input image,
$xi_0$ and $xi_1$ are pixels at respective locations $i_0$ and $i_1$,
$i_0 \in$ int, and
$i_{phase} \in [0,1)$.

15. The computer program product of claim 14, wherein said logic to cause the processor to scale the input image using 8-tap Lanczos filtering comprises:
logic to cause the processor to calculate a pixel of the second output as $$y_i^L = \Sigma x i_k h_k^{iphase} \text{ where } k=-3,-2,\ldots,4$$

where $h_k^{iphase}$ is a sample from a 4-lobed Lanczos-windowed function $$h_k^{iphase} = (\sin \pi[(k-i_{phase})*sf]/\pi[(k-i_{phase})*sf])(\sin \pi[((k-i_{phase})/4)*sf]/\pi[((k-i_{phase})/4)*sf]) \text{ when } |k-i_{phase}|*sf| < 4, \text{ and}$$

$$h_k^{iphase} = 0 \text{ when } |k-i_{phase}|*sf| >= 4.$$

16. The computer program product of claim 15, wherein said logic to cause the processor to blend the first and second outputs comprises:
logic to cause the processor to calculate a pixel $y_i^{BL}$ as $$y_i^{BL} = \alpha_i * y_i^L + (1-\alpha_i) * y_i^B,$$

where $\alpha_i = f(xi_{-3}, xi_{-2}, xi_{-1}, xi_0, xi_1, xi_2, xi_3, xi_4)$ and $\alpha$ is a function of local content.

17. The computer program product of claim 15, wherein said logic to cause the processor to detect artifacts comprises:
logic to cause the processor to determine whether the following conditions are met:

$$|y_i^L - y_i^B| > f_1(Xi_{-3}, Xi_{-2}, \ldots, Xi_3, Xi_4);$$

$$|Xi_0 - Xi_1| < f_2(Xi_{-3}, Xi_{-2}, \ldots, Xi_3, Xi_4);$$

$$|Xi_0 - Xi_{-1}| > f_3(Xi_{-3}, Xi_{-2}, \ldots, Xi_3, Xi_4);$$

$$\text{sign}[(Xi_0 - Xi_{-1}) * h_{-1}^{iphase}] < 0;$$

$$!\{[|Xi_{k-1} - Xi_k| > f_4(Xi_{-3}, Xi_{-2}, \ldots, Xi_3, Xi_4)] \& [||Xi_{k-1} - Xi_k| - |Xi_0 - Xi_{-1}|| > f_5(Xi_{-3}, Xi_{-2}, \ldots, Xi_3, Xi_4)]\}$$

for all k=−2, −1, 0, 1, 2, 3, 4
or $$|y_i^L - y_i^B|/(y_i^L + y_i^B) > f_6(Xi_{-3}, Xi_{-2}, \ldots, Xi_3, Xi_4),$$

where, when the conditions are met, pixel $y_i^{BL}$ is determined to be an artifact.

18. The computer program product of claim 17, wherein said logic to cause the processor to correct artifacts comprises:
logic to cause the processor to replace $y_i^{BL}$ with $y_i^B$.

* * * * *